US008722551B2

(12) United States Patent
Mayernik et al.

(10) Patent No.: US 8,722,551 B2
(45) Date of Patent: May 13, 2014

(54) FLAME RETARDANT COMPOSITION AND TEXTILE MATERIAL COMPRISING THE SAME

(75) Inventors: Richard A. Mayernik, Simpsonville, SC (US); Shulong Li, Spartanburg, SC (US); William C. Kimbrell, Spartanburg, SC (US)

(73) Assignee: Milliken & Company, Spartanburg, SC (US)

( * ) Notice: Subject to any disclaimer, the term of this patent is extended or adjusted under 35 U.S.C. 154(b) by 63 days.

(21) Appl. No.: 13/616,231

(22) Filed: Sep. 14, 2012

(65) Prior Publication Data

US 2013/0252495 A1    Sep. 26, 2013

Related U.S. Application Data

(60) Provisional application No. 61/632,408, filed on Sep. 16, 2011.

(51) Int. Cl.
*B32B 5/02* (2006.01)
*D06M 15/673* (2006.01)

(52) U.S. Cl.
USPC ............ 442/143; 442/136; 428/920; 428/921

(58) Field of Classification Search
USPC ........................................................ 442/136
See application file for complete search history.

(56) References Cited

U.S. PATENT DOCUMENTS

| 2,668,096 | A | 2/1954 | Reeves et al. | |
|---|---|---|---|---|
| 2,809,941 | A | 10/1957 | Reeves et al. | |
| 3,855,349 | A | 12/1974 | Date et al. | |
| 4,014,829 | A | 3/1977 | Baird et al. | |
| 4,015,037 | A | 3/1977 | Smith et al. | |
| 4,095,945 | A | 6/1978 | Umetani et al. | |
| 4,166,897 | A | 9/1979 | Umetani et al. | |
| 8,012,891 | B2 * | 9/2011 | Li et al. | 442/143 |
| 2011/0275263 | A1 * | 11/2011 | Li et al. | 442/142 |
| 2011/0275264 | A1 * | 11/2011 | McBride et al. | 442/143 |
| 2011/0281097 | A1 * | 11/2011 | Li et al. | 428/219 |
| 2012/0156486 | A1 * | 6/2012 | Bisjak et al. | 428/375 |
| 2013/0189518 | A1 * | 7/2013 | Li et al. | 428/373 |
| 2013/0196135 | A1 * | 8/2013 | Li et al. | 428/221 |
| 2013/0252495 | A1 * | 9/2013 | Mayernik et al. | 442/142 |

FOREIGN PATENT DOCUMENTS

| EP | 0 470 640 A1 | 2/1992 |
|---|---|---|
| GB | 1007580 | 10/1965 |
| GB | 1 368 987 | 10/1974 |
| GB | 1 522 108 | 8/1978 |
| GB | 1 545 793 | 5/1979 |

OTHER PUBLICATIONS

Daigle, et al., A Flame-Retardant Finish Based upon Tris(hydroxymethyl)phosphine, *Textile Research Journal*, Jun. 1972, pp. 347-353, Southern Regional Research Laboratory, New Orleans, Louisiana 70179, U.S.A.

Pepperman, Jr. et al., Hydrolysis Characteristics of Some Thpc-Based Flame Retardant Finished on Cotton, *Journal of Fire Retardant Chemistry*, May 1975, pp. 110-115, vol. 2, Southern Regional Research Center, New Orleans, Louisiana 70179, U.S.A.

Kasem, et al., Preparation and Characterization of Phosphorus-Nitrogen Polymers for Flameproofing Cellulose. I. Polymers of THPC and Amines, *Journal of Applied Polymer Science*, 1971, pp. 2237-2243, vol. 15, John Wiley & Sons, Inc., USA.

Wu et al., Comparison of DMDHEU and Melamine-formaldehyde as the Binding Agents for a Hydroxy-functional Organophosphorus Flame Retarding Agent on Cotton, *Journal of Fire Sciences*, Mar. 2004, pp. 125-142, vol. 22, Sage Publications, USA.

International Search Report for PCT/US2012/055434 filed internationally on Sep. 14, 2012.

\* cited by examiner

*Primary Examiner* — Lynda Salvatore
(74) *Attorney, Agent, or Firm* — Robert M. Lanning

(57) ABSTRACT

A flame retardant composition comprises a phosphorous-containing polymer. The phosphorous-containing polymer can be produced by first reacting a phosphonium compound and a nitrogen-containing compound to produce a precondensate compound and then reacting the precondensate compound with a cross-linking composition. The resulting phosphorous-containing intermediate polymer can then be oxidized to convert at least a portion of the phosphorous atoms in the polymer to a pentavalent state. A textile material comprises a textile substrate and a phosphorous-containing polymer, such as that described above.

32 Claims, No Drawings

FLAME RETARDANT COMPOSITION AND TEXTILE MATERIAL COMPRISING THE SAME

CROSS-REFERENCE TO RELATED PATENT APPLICATIONS

This application claims, pursuant to 35 U.S.C. §119(e)(1), priority to and the benefit of the filing date of U.S. Patent Application No. 61/632,408 filed on Sep. 16, 2011, which application is hereby incorporated by reference in its entirety.

TECHNICAL FIELD OF THE INVENTION

The invention described in the present application generally relates to flame retardant compositions and textile materials comprising the same.

BACKGROUND

Flame resistant fabrics are useful in many applications, including the production of garments worn by personnel in a variety of industries or occupations, such as the military, electrical (for arc protection), petroleum chemical manufacturing, and emergency response fields. Cellulosic or cellulosic-blend fabrics have typically been preferred for these garments, due to the availability of chemical treatments designed to render these fabrics flame resistant and the relative comfort of such fabrics to the wearer.

Notwithstanding the popularity of cellulosic or cellulosic-blend flame resistant fabrics, existing fabrics do suffer from limitations. The flammability performance of many cellulosic flame resistant fabrics is not sufficient to meet the demanding requirements of certain industries. In order to meet these requirements, inherent flame resistant fibers (e.g., meta-aramid fibers, such as NOMEX® fiber from E. I. du Pont de Nemours and Company) are often employed, which increases the cost of the fabrics. Accordingly, a need remains to provide alternative flame retardant compounds that can be used to improve the flame resistance of fabrics. A need also remains for flame resistant fabrics that have been treated with such flame retardant compounds and are capable of meeting applicable flame resistance standards.

BRIEF SUMMARY OF THE INVENTION

The invention described in the present application generally provides a flame retardant composition derived from one or more phosphorous-containing compounds. These phosphorous-containing compounds are generally produced by reacting a phosphonium compound with a nitrogen-containing compound to produce a precondensate compound. This precondensate compound can then be reacted with a cross-linking composition to produce a phosphorous-containing polymer that can then be subsequently oxidized to convert at least a portion of the phosphorous atoms in the polymer to a pentavalent state. The invention also provides a textile material that comprises a textile substrate and such a flame retardant composition, and the invention provides a method for treating a textile substrate with such a flame retardant composition.

In a first embodiment, the invention provides a flame retardant composition comprising a phosphorous-containing polymer. The phosphorous-containing polymer can be produced by (a) reacting a reactant mixture in a condensation reaction to produce a precondensate compound, (b) reacting the precondensate compound from (a) and a cross-linking composition in a condensation reaction to produce a phosphorous-containing intermediate polymer, and (c) reacting the phosphorous-containing intermediate polymer from (b) with an oxidizing agent to produce the phosphorous-containing polymer. The reactant mixture used in (a) can comprise a phosphonium compound and a nitrogen-containing compound. The phosphonium compound can conform to the structure of Formula (I)

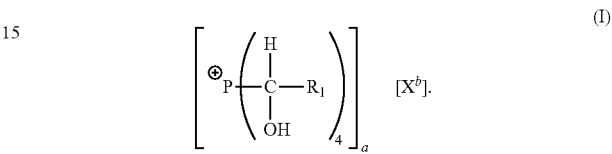

In the structure of Formula (I), $R_1$ can be selected from the group consisting of hydrogen, $C_1$-$C_3$ alkyl, $C_1$-$C_3$ haloalkyl, $C_2$-$C_3$ alkenyl, and $C_2$-$C_3$ haloalkenyl; X can be an anion selected from the group consisting of chloride, sulfate, hydrogen sulfate, phosphate, acetate, carbonate, bicarbonate, borate, and hydroxide; b is the charge of the anion X; and a is equal to (−b). The nitrogen-containing compound can conform to the structure of Formula (II)

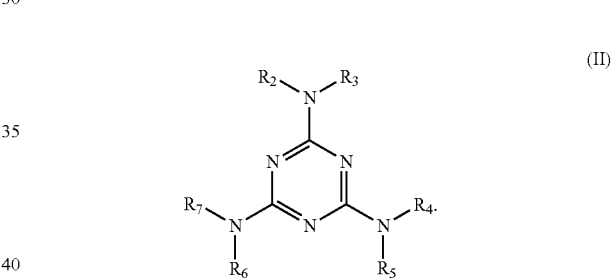

In the structure of Formula (II), $R_2$, $R_3$, $R_4$, $R_5$, $R_6$, and $R_7$ can be independently selected from the group consisting of hydrogen, hydroxymethyl, and alkoxymethyl. The cross-linking composition used in (b) can comprise urea and/or an alkylene urea compound selected from the group consisting of ethylene urea, propylene urea, and mixtures thereof. In (c), the phosphorous-containing intermediate polymer is reacted with the oxidizing agent under conditions sufficient to convert at least a portion of the phosphorous atoms in the phosphorous-containing intermediate polymer to a pentavalent state.

In a second embodiment, the invention provides a textile material comprising a textile substrate and a phosphorous-containing polymer. The phosphorous-containing polymer can be produced by (a) reacting a reactant mixture in a condensation reaction to produce a precondensate compound, (b) reacting the precondensate compound from (a) and a cross-linking composition in a condensation reaction to produce a phosphorous-containing intermediate polymer, and (c) reacting the phosphorous-containing intermediate polymer from (b) with an oxidizing agent to produce the phosphorous-containing polymer. The reactant mixture used in (a) can comprise a phosphonium compound and a nitrogen-containing compound. The phosphonium compound can conform to the structure of Formula (I)

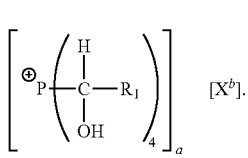

(I)

In the structure of Formula (I), $R_1$ can be selected from the group consisting of hydrogen, $C_1$-$C_3$ alkyl, $C_1$-$C_3$ haloalkyl, $C_2$-$C_3$ alkenyl, and $C_2$-$C_3$ haloalkenyl; X can be an anion selected from the group consisting of chloride, sulfate, hydrogen sulfate, phosphate, acetate, carbonate, bicarbonate, borate, and hydroxide; b is the charge of the anion X; and a is equal to (−b). The nitrogen-containing compound can conform to the structure of Formula (II)

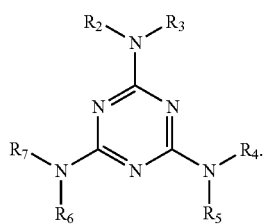

(II)

In the structure of Formula (II), $R_2$, $R_3$, $R_4$, $R_5$, $R_6$, and $R_7$ can be independently selected from the group consisting of hydrogen, hydroxymethyl, and alkoxymethyl. The cross-linking composition used in (b) can comprise urea and/or an alkylene urea compound selected from the group consisting of ethylene urea, propylene urea, and mixtures thereof. In (c), the phosphorous-containing intermediate polymer is reacted with the oxidizing agent under conditions sufficient to convert at least a portion of the phosphorous atoms in the phosphorous-containing intermediate polymer to a pentavalent state.

In a third embodiment, the invention provides a method for treating a textile substrate. The method can comprise the steps of (a) providing a textile substrate, (b) contacting at least a portion of the textile substrate with a treatment composition to deposit the treatment composition thereon, the treatment composition comprising a precondensate compound and a cross-linking composition, (c) heating the textile substrate from step (b) to a temperature sufficient for the precondensate compound and the cross-linking composition to react in a condensation reaction and produce a phosphorous-containing intermediate polymer, and (d) exposing at least a portion of the textile substrate having the phosphorous-containing intermediate polymer thereon to an oxidizing agent under conditions sufficient to convert at least a portion of the phosphorous atoms in the phosphorous-containing intermediate polymer to a pentavalent state. The cross-linking composition present in the treatment composition of (b) can comprise urea and/or an alkylene urea compound selected from the group consisting of ethylene urea, propylene urea, and mixtures thereof. The precondensate compound present in the treatment composition of (b) can be produced by reacting a reactant mixture in a condensation reaction. The reactant mixture can comprise a phosphonium compound conforming to the structure of Formula (I)

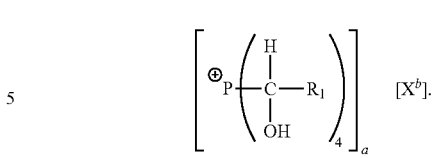

(I)

In the structure of Formula (I), $R_1$ can be selected from the group consisting of hydrogen, $C_1$-$C_3$ alkyl, $C_1$-$C_3$ haloalkyl, $C_2$-$C_3$ alkenyl, and $C_2$-$C_3$ haloalkenyl; X can be an anion selected from the group consisting of chloride, sulfate, hydrogen sulfate, phosphate, acetate, carbonate, bicarbonate, borate, and hydroxide; b is the charge of the anion X; and a is equal to (−b). The reactant mixture can also comprise a nitrogen-containing compound conforming to the structure of Formula (II)

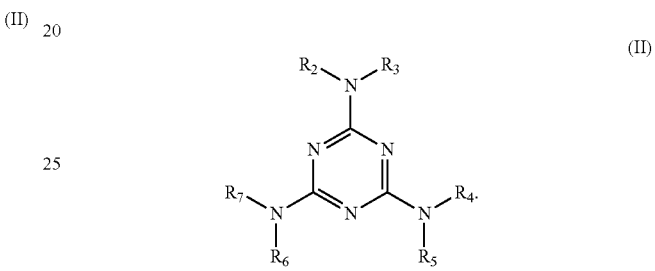

(II)

In the structure of Formula (II), $R_2$, $R_3$, $R_4$, $R_5$, $R_6$, and $R_7$ can be independently selected from the group consisting of hydrogen, hydroxymethyl, and alkoxymethyl.

DETAILED DESCRIPTION OF THE INVENTION

As noted above, the invention provides flame retardant compositions and flame resistant textile materials made using such compositions. As utilized herein, the term "flame resistant" refers to a material that burns slowly or is self-extinguishing after removal of an external source of ignition. The flame resistance of textile materials can be measured by any suitable test method, such as those described in National Fire Protection Association (NFPA) 701 entitled "Standard Methods of Fire Tests for Flame Propagation of Textiles and Films," ASTM D6413 entitled "Standard Test Method for Flame Resistance of Textiles (vertical test)", NFPA 2112 entitled "Standard on Flame Resistant Garments for Protection of Industrial Personnel Against Flash Fire", ASTM F1506 entitled "The Standard Performance Specification for Flame Resistant Textile Materials for Wearing Apparel for Use by Electrical Workers Exposed to Momentary Electric Arc and Related Thermal Hazards", and ASTM F1930 entitled "Standard Test Method for Evaluation of Flame Resistant Clothing for Protection Against Flash Fire Simulations Using an Instrumented Manikin."

In a first embodiment, the invention provides a flame retardant composition comprising a phosphorous-containing polymer. The phosphorous-containing polymer can be produced by first reacting a reactant mixture in a condensation reaction to produce a precondensate compound. The reactant mixture can comprise a phosphonium compound and a nitrogen-containing compound.

The reactant mixture can comprise any suitable phosphonium compound. As utilized herein, the term "phosphonium compound" refers to a compound containing a phosphonium cation, which is a positively charged substituted phosphine.

The phosphonium compound can comprise a phosphonium cation substituted with any suitable substituents, such as alkyl, haloalkyl, alkenyl, and haloalkenyl groups, all of which can be substituted with at least one hydroxyl group. In a preferred embodiment, the reactant mixture comprises at least one phosphonium compound conforming to the structure of Formula (I)

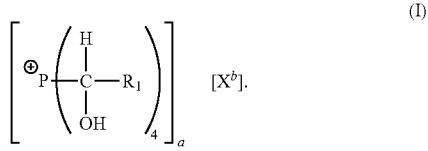

In the structure of Formula (I), $R_1$ can be any suitable group, such as an alkyl group, a haloalkyl group, an alkenyl group, or a haloalkenyl group. In a preferred embodiment, $R_1$ is selected from the group consisting of hydrogen, $C_1$-$C_3$ alkyl, $C_1$-$C_3$ haloalkyl, $C_2$-$C_3$ alkenyl, and $C_2$-$C_3$ haloalkenyl. In another preferred embodiment, $R_1$ can be hydrogen. In the structure of Formula (I), X represents an anion and can be any suitable monatomic or polyatomic anion. In a preferred embodiment, X can be an anion selected from the group consisting of halides (e.g., chloride), sulfate, hydrogen sulfate, phosphate, acetate, carbonate, bicarbonate, borate, and hydroxide. In another preferred embodiment, X is a sulfate anion. In the structure of Formula (I), b represents the charge of the anion X. Therefore, in order to provide a phosphonium compound that is charge neutral, the number of phosphonium cations present in the compound is equal to (−b). Examples of phosphonium compounds that are suitable for use in the reactant mixture include, but are not limited to, tetrahydroxymethyl phosphonium salts, such as tetrahydroxymethyl phosphonium chloride, tetrahydroxymethyl phosphonium sulfate, tetrahydroxymethyl phosphonium acetate, tetrahydroxymethyl phosphonium carbonate, tetrahydroxymethyl phosphonium borate, and tetrahydroxymethyl phosphonium phosphate. The reactant mixture can comprise one phosphonium compound, or the reactant mixture can comprise a mixture of two or more phosphonium compounds.

The reactant mixture can comprise any suitable nitrogen-containing compound or combination of nitrogen-containing compounds. In a preferred embodiment, the reactant mixture comprises at least one nitrogen-containing compound conforming to the structure of Formula (II)

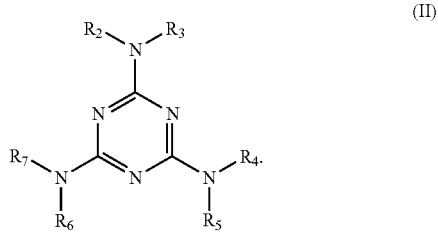

In the structure of Formula (II), $R_2$, $R_3$, $R_4$, $R_5$, $R_6$, and $R_7$ can be any suitable groups. In a preferred embodiment, $R_2$, $R_3$, $R_4$, $R_5$, $R_6$, and $R_7$ are independently selected from the group consisting of hydrogen, hydroxymethyl, and alkoxymethyl. Suitable nitrogen-containing compounds include, but are not limited to, melamine, methylolated melamines, and alkoxymethyl melamines (e.g., etherified methylol melamines). The reactant mixture can comprise one nitrogen-containing compound, or the reactant mixture can comprise a mixture of two or more nitrogen-containing compounds.

The reactant mixture can contain any suitable amounts of the phosphonium compound and the nitrogen-containing compound. The amounts of the phosphonium compound and the nitrogen-containing compound in the reactant mixture can be expressed through a molar ratio of the two components in the reactant mixture. However, as will be understood by those skilled in the art (and as illustrated below), it is the phosphonium cation(s) in the phosphonium compound that participate in the reaction between the phosphonium compound and the nitrogen-containing compound. (The phosphonium compound's counterion is simply there to balance the charge.) Thus, in order to accurately express the relative amount of each reactive component present in the reactant mixture, the molar amount of the phosphonium compound present in the reactant mixture should be normalized to express the number of reactive phosphonium cations contributed to the reactant mixture by the phosphonium compound. This can be simply done by taking the number of moles of the phosphonium compound present in the reactant mixture and multiplying this value by the number of phosphonium cations present in a molecule of the phosphonium compound. For example, if the reactant mixture contains one mole of a phosphonium compound containing two phosphonium cations per molecule (e.g., tetrahydroxymethyl phosphonium sulfate), then the reactant mixture will contain two moles of reactive phosphonium cations ([1 mole of tetrahydroxymethyl phosphonium sulfate]×[2 phosphonium cations per molecule of tetrahydroxymethyl phosphonium sulfate]=2 moles of phosphonium cations). If two or more phosphonium compounds are present in the reactant mixture, then this calculation must be separately performed for each phosphonium compound. The results from each calculation can then be added to arrive at the total number of moles of reactive phosphonium cations present in the reactant mixture. The figure representing the number of moles of phosphonium cations present in the reactant mixture and the molar amount of the nitrogen-containing compound can then be used to express the relative amounts of the phosphonium compound and the nitrogen-containing compound in the reactant mixture (e.g., a molar ratio of phosphonium cations to nitrogen-containing compound), as discussed below.

Preferably, the phosphonium compound and the nitrogen-containing compound are present in the reactant mixture in an initial molar ratio of phosphonium cations to nitrogen-containing compound of about 50:1 or less, about 40:1 or less, about 30:1 or less, about 25:1 or less, about 20:1 or less, about 15:1 or less, about 10:1 or less, or about 8:1 or less. The phosphonium compound and the nitrogen-containing compound preferably are present in the reactant mixture in an initial molar ratio of phosphonium cations to nitrogen-containing compound of about 3:1 or more or about 6:1 or more. In a preferred embodiment, the phosphonium compound and the nitrogen-containing compound are present in the reactant mixture in an initial molar ratio of phosphonium cations to nitrogen-containing compound of about 50:1 to about 3:1. In another preferred embodiment, the phosphonium compound and the nitrogen-containing compound are present in the reactant mixture in an initial molar ratio of phosphonium cations to nitrogen-containing compound of about 40:1 to about 3:1, about 30:1 to about 3:1, about 25:1 to about 3:1, about 20:1 to about 3:1 (e.g., about 20:1 to about 10:1, about 18:1 to about 14:1, about 17:1 to about 15:1, or about 16:1), about 15:1 to about 3:1 (e.g., about 15:1 to about 6:1), about 10:1 to about 3:1, or about 8:1 to about 3:1 (e.g., about 6:1).

In a particularly preferred embodiment, such as when the nitrogen-containing compound is melamine, the phosphonium compound and the nitrogen-containing compound are present in the reactant mixture in an initial molar ratio of phosphonium cations to nitrogen-containing compound of about 20:1 to about 10:1, more preferably about 18:1 to about 14:1, and most preferably about 17:1 to about 15:1 (e.g., about 16:1).

The reactant mixture can contain other components in addition to the phosphonium compound and the nitrogen-containing compound described above. For example, the reactant mixture can contain other nitrogenous compounds, such as urea, guanazole, biguanide, or alkylene ureas. While these other nitrogenous compounds can be present in the reactant mixture, they are typically present in a relatively small amount as compared to the amount of the nitrogen-containing compound present in the reactant mixture. The reactant mixture can also contain a surfactant, such as an alkoxylated alcohol, which aids in the dispersion of the nitrogen-containing compound as described below. The reactant mixture can also contain one or more pH buffers, such as acetate salts (e.g., sodium acetate), phosphate salts (e.g., alkaline metal phosphate salts), tertiary amines, and amino alcohols.

The components of the reactant mixture can be reacted under any suitable conditions which result in a condensation reaction between the phosphonium compound and the nitrogen-containing compound. In one possible embodiment, the phosphonium compound is provided in the form of an aqueous solution and the nitrogen-containing compound (e.g., melamine) is provided in the form of a solid or a solid dispersed in a liquid medium. Generally, in order to facilitate the reaction between the phosphonium compound and the nitrogen-containing compound, the nitrogen-containing compound is provided in the form of a solid (e.g., powder) having relatively small particle size, such as an average particle size of about 100 µm or less. In this embodiment, the nitrogen-containing compound is added to the aqueous solution of the phosphonium compound while the solution is vigorously agitated. In order to further facilitate the incorporation of the nitrogen-containing compound in the solution, a surfactant can be added. Any suitable surfactant can be used, such as an alkoxylated alcohol. Once the nitrogen-containing compound is added to the solution, the resulting reactant mixture is heated to a temperature sufficient to effect a condensation reaction between the phosphonium compound and the nitrogen-containing compound. In a preferred embodiment, the reactant mixture is heated to a temperature of about 60° C. to about 90° C. and maintained within this temperature range for a sufficient amount of time for the phosphonium compound and the nitrogen-containing compound to react, such as about 2 hours to about 8 hours. Generally, the phosphonium compound is provided in a molar excess relative to the amount of the nitrogen-containing compound, and the reactant mixture is maintained at the elevated temperature for a sufficient amount of time for the nitrogen-containing compound to be completely consumed by the condensation reaction. Since the precondensate compound formed by the reaction of the phosphonium compound and the nitrogen-containing compound is water-soluble, the complete consumption of the nitrogen-containing compound can be visually confirmed by the absence of solid particles of the nitrogen-containing compound in the reactant mixture.

Although the exact chemical structure of the precondensate compound has not been determined, the structure of Formula (V) below depicts one example of a precondensate compound that is believed to be formed by the condensation reaction described above.

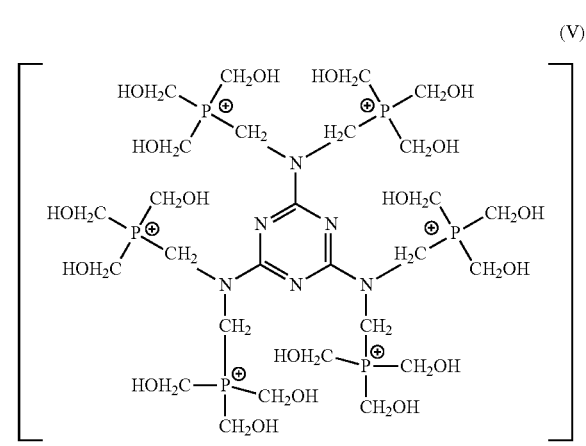

(V)

The precondensate compound depicted in the structure of Formula (V) can be produced by reacting a tetrahydroxymethyl phosphonium salt with melamine. For the sake of simplicity, the counterions balancing the overall positive charge of the molecule have not been depicted. As it is depicted in the structure of Formula (V), the phosphonium compound (i.e., tetrahydroxymethyl phosphonium salt) was present in a sufficient amount to replace each of the six amine hydrogens present on the melamine. With such an excess of the phosphonium compound present in the reactant mixture, the resulting precondensate compound may also contain oligomers (e.g., dimers, trimmers, etc.) in which two or more melamine "cores" have been cross-linked by phosphonium compound molecules. Furthermore, when an excess of the phosphonium compound is used, the condensation reaction may produce a precondensate compound that is contained within a composition comprising a significant amount of unreacted phosphonium compound, such as about 1% to about 50% excess phosphonium compound.

After the phosphonium compound and the nitrogen-containing compound have been reacted to form a precondensate compound, the resulting precondensate compound is reacted with a cross-linking composition in a condensation reaction to produce a phosphorous-containing intermediate polymer. The cross-linking composition can comprise any suitable cross-linking compound. Preferably, the cross-linking compound comprises two nitrogen-containing functional groups that are capable of reacting with the hydroxyl-bearing carbon atoms of the precondensate compound. (These hydroxyl-bearing carbon atoms are those from the phosphonium compound that did not react with the nitrogen-containing compound when the precondensate compound was formed. An exemplary compound containing such hydroxyl-bearing carbon atoms is depicted in the structure of Formula (V) above.) In a preferred embodiment, the reactive nitrogen-containing functional groups of the cross-linking compound have only one hydrogen atom directly bonded to the nitrogen atom. Thus, when such a cross-linking compound reacts with the precondensate compound, the nitrogen-containing functional groups forming the cross-links will no longer have any hydrogen atoms directly bonded to the nitrogen atom of the functional group. While not wishing to be bound to any particular theory, it is believed that such a cross-link (i.e., a cross-link in which the nitrogen atom does not have a hydrogen atom bonded thereto) is less susceptible to oxidative attack (e.g., attack by oxidative chlorine) than a cross-link in which the nitrogen atom still bears a hydrogen atom. This reduced susceptibility to oxidative attack is believed to contribute, at least in part, to improved wash durability of the resulting flame retardant composition.

The cross-linking composition can comprise any suitable cross-linking compound possessing the reactive nitrogen-containing functional groups described above. In a preferred embodiment, the cross-linking composition comprises urea. In another preferred embodiment, the cross-linking composition comprises an alkylene urea compound (e.g., a cyclic alkylene urea compound). The alkylene urea compound preferably is selected from the group consisting of ethylene urea, propylene urea, and mixtures thereof. In another preferred embodiment, the cross-linking composition comprises a mixture of an alkylene urea compound (e.g., a cyclic alkylene urea compound) and urea. As with the prior embodiment employing the alkylene urea compound, the alkylene urea compound preferably is selected from the group consisting of ethylene urea, propylene urea, and mixtures thereof.

The cross-linking composition can contain other compounds in addition to the alkylene urea compound mentioned above. For example, the cross-linking composition can contain additional cross-linking agents (i.e., cross-linking agents in addition to the alkylene urea compound). Cross-linking agents suitable for such use include, for example, a guanidine (i.e., guanidine, a salt thereof, or a guanidine derivative, such as cyanoguanidine), guanyl urea, glycoluril, ammonia, an ammonia-formaldehyde adduct, an ammonia-acetaldehyde adduct, an ammonia-butyraldehyde adduct, an ammonia-chloral adduct, glucosamine, a polyamine (e.g., polyethyleneimine, polyvinylamine, polyetherimine, polyethyleneamine, polyacrylamide, chitosan, aminopolysaccharides), glycidyl ethers, isocyanates, blocked isocyanates and combinations thereof. While these other cross-linking agents can be present in the cross-linking composition, they typically are present in a relatively small amount as compared to the amount of the primary cross-linking compound (e.g., alkylene urea) present in the cross-linking composition.

As noted above, in one preferred embodiment, the cross-linking composition comprises a mixture of an alkylene urea compound and urea. More preferably, the composition comprises a mixture of ethylene urea and urea. The alkylene urea compound and the urea can be present in the cross-linking composition in any suitable ratio. For example, the alkylene urea compound and the urea can be present in the cross-linking composition in a molar ratio of alkylene urea compound to urea of about 10:1 or less, about 9:1 or less, about 8:1 or less, about 7:1 or less, about 6:1 or less, about 5:1 or less, about 4:1 or less, about 3:1 or less, about 2:1 or less, or about 1:1 or less. The alkylene urea compound and the urea can be present in the cross-linking composition in a molar ratio of alkylene urea compound to urea of about 1:10 or more, about 1:9 or more, about 1:8 or more, about 1:7 or more, about 1:6 or more, about 1:5 or more, about 1:4 or more, about 1:3 or more, about 1:2 or more, or about 1:1 or more. Thus, in a series of preferred embodiments, the alkylene urea compound and the urea can be present in the cross-linking composition in a molar ratio of alkylene urea compound to urea of about 10:1 to about 1:10, about 9:1 to about 1:9, about 8:1 to about 1:8, about 7:1 to about 1:7, about 6:1 to about 1:6, about 5:1 to about 1:5, about 4:1 to about 1:4, about 3:1 to about 1:3, about 2:1 to about 1:2, or about 1:1.

The precondensate compound and the cross-linking composition can be reacted in any suitable amounts that result in a condensation reaction between the two. In a preferred embodiment, the precondensate compound and the cross-linking composition are reacted at an initial weight ratio of precondensate compound to cross-linking composition of about 1:2 or more, about 1:1 or more, about 3:2 or more, about 2:1 or more, or about 3:1 or more. In another preferred embodiment, the precondensate compound and the cross-linking composition are reacted at an initial weight ratio of precondensate compound to cross-linking composition of about 10:1 or less, about 9:1 or less, about 8:1 or less, about 7:1 or less, about 6:1 or less, about 5:1 or less, about 4:1 or less, or about 3:1 or less. Thus, in certain preferred embodiments, the precondensate compound and the cross-linking composition are reacted at an initial weight ratio of precondensate compound to cross-linking composition of about 1:2 to about 10:1 (e.g., about 1:2 to about 5:1), about 1:1 to about 10:1 (e.g., about 1:1 to about 8:1, about 1:1 to about 6:1, about 1:1 to about 5:1, or about 1:1 to about 4:1), about 3:2 to about 10:1 (e.g., about 3:2 to about 8:1, about 3:2 to about 4:1), or about 2:1 to about 10:1 (e.g., about 2:1 to about 8:1, about 2:1 to about 6:1, about 2:1 to about 5:1, about 2:1 to about 4:1, or about 2:1 to about 3:1). In one preferred embodiment, such as when the cross-linking composition comprises urea, the precondensate compound and the cross-linking composition are reacted at an initial weight ratio of precondensate compound to cross-linking composition of about 1:1 to about 5:1, more preferably about 2:1 to about 4:1, or about 3:1.

As noted above, the cross-linking composition can contain more than one distinct compound. For the purposes of calculating the ratios described in the preceding paragraph, the amount of the cross-linking composition will be the amount (by weight) of the component(s) in the cross-linking composition that are capable of reacting with the precondensate compound in a condensation reaction. Thus, when the cross-linking composition contains only one compound that is capable of reacting with the precondensate compound (e.g., an alkylene urea), then the amount used in calculating the above-described ratios will be the amount (by weight) of this compound (e.g., the alkylene urea) present in the cross-linking composition. And, if the cross-linking composition contains more than one compound that is capable of reacting with the precondensate compound, the amount used for the purposes of calculating the ratios described in the preceding paragraph will be the total amount (by weight) of "reactive" compounds present in the cross-linking composition. This value is simply the sum of the weight of each "reactive" compound present in the present in the cross-linking composition. In either case, solvents, carriers, and other non-reactive components present in the cross-linking composition are not factored into the calculated ratios described in the preceding paragraph.

The precondensate compound and the cross-linking composition can be reacted under any suitable conditions which result in a condensation reaction between the precondensate compound and the cross-linking composition (i.e., the reactive compound(s) present in the cross-linking composition). The two components can react at ambient temperature, but the rate of reaction will be relatively slow. Thus, the precondensate compound and the cross-linking composition generally are combined and heated to an elevated temperature in order to effect an expedient condensation reaction. The resulting mixture (i.e., the mixture of the precondensate compound and the cross-linking composition) can be heated to any suitable temperature that effects the desired condensation reaction between the two. In a preferred embodiment, the resulting mixture is heated to a temperature of about 120° C. to about 180° C. In order to afford the precondensate compound and the cross-linking composition sufficient time to react, the resulting mixture typically is held at the elevated temperature for a period of time. In a preferred embodiment, the mixture is held at the elevated temperature for about thirty seconds or more.

In carrying out the condensation reaction between the precondensate compound and the cross-linking composition, the precondensate compound and the cross-linking composition can be provided in any suitable form(s). For example, the precondensate compound can be provided in the form of an aqueous solution, dispersion or suspension. Typically, the precondensate compound is provided in the form of an aqueous solution. In such an embodiment, the cross-linking composition can be provided in the form of a solid that is added to the aqueous solution, or the cross-linking composition can be provided in the form of a solution or dispersion that is mixed with the aqueous solution.

The reaction of the precondensate compound and the cross-linking composition results in a phosphorous-containing intermediate polymer. Since the phosphorous-containing intermediate polymer was produced from a precondensate compound containing phosphonium cations, the intermediate polymer will contain quaternary phosphorous atoms. The structure depicted in Formula (X) below shows one possible structure for a segment of a polymer produced by the reaction of ethylene urea with a precondensate compound, which precondensate compound has been made by reacting a tetrahydroxymethyl phosphonium salt and melamine.

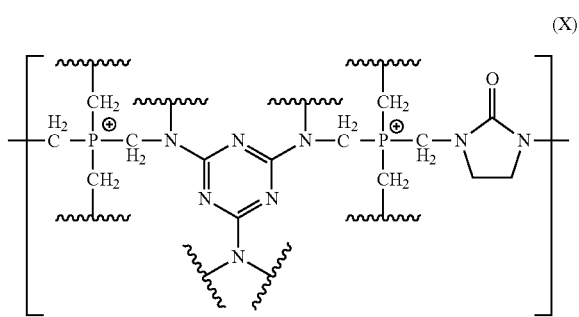

(X)

While such a polymer (i.e., a polymer containing quaternary phosphorous atoms) is relatively stable, it is believed that the stability and, for example, wash durability of the polymer can be increased by converting at least a portion of the phosphorous atoms in the polymer into a pentavalent state. The structure depicted in Formula (XI) below shows the segment depicted in Formula (X) after the phosphorous atoms have been converted into a pentavalent state.

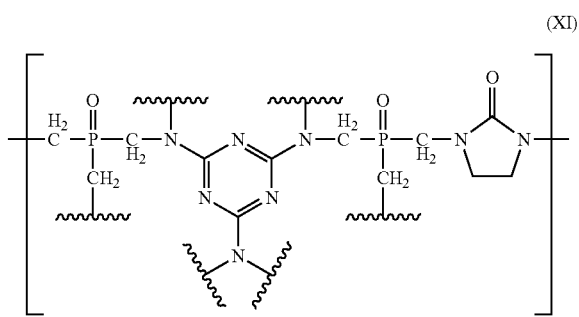

(XI)

As can be seen from the structure depicted above, the conversion of a phosphorous atom from a quaternary state to a pentavalent involves an oxidation that converts the quaternary phosphonium group into a phosphine oxide group. This conversion (i.e., oxidation of the quaternary phosphonium groups to a pentavalent state) can be effected by reacting the phosphorous-containing intermediate polymer with a suitable oxidizing agent. Suitable oxidizing agents include, but are not limited to, oxygen (e.g., gaseous oxygen), hydrogen peroxide, sodium perborate, sodium hypochlorite, percarbonate (e.g., alkaline metal percarbonates), ozone, peracetic acid, and mixtures or combinations thereof. Suitable oxidizing agents also include compounds that are capable of generating hydrogen peroxide or peroxide species, which compounds can be used alone or in combination with any of the oxidizing agents listed above. As noted above, the phosphorous containing intermediate polymer is exposed to the oxidizing agent for a period of time and under conditions sufficient for at least a portion of the phosphorous atoms in the intermediate polymer to be converted to a pentavalent state. In a preferred embodiment, the phosphorous containing intermediate polymer is exposed to the oxidizing agent for a period of time and under conditions sufficient to convert substantially all of the phosphorous atoms in the intermediate polymer to a pentavalent state.

In a second embodiment, the invention provides a textile material comprising a textile substrate and a phosphorous-containing polymer. Phosphorous-containing polymers suitable for use in this embodiment of the invention have been described above in connection with the first embodiment of the invention, and each of the phosphorous-containing polymers described therein can be used in the textile material embodiment of the invention.

The textile material of the invention can comprise any suitable amount of the phosphorous-containing polymer. In a preferred embodiment, the phosphorous-containing polymer is present in the textile material in an amount that provides about 0.5% or more (e.g., about 1% or more, about 1.5% or more, about 2% or more, about 2.5% or more, about 3% or more, about 3.5% or more, about 4% or more, or about 4.5% or more) of elemental phosphorus based on the weight of the untreated textile substrate. In another preferred embodiment, the phosphorous-containing polymer is present in the textile material in an amount that provides about 5% or less (e.g., about 4.5% or less, about 4% or less, about 3.5% or less, about 3% or less, about 2.5% or less, about 2% or less, about 1.5% or less, or about 1% or less) of elemental phosphorus based on the weight of the untreated textile substrate. Preferably, the phosphorous-containing polymer is present in the textile material in an amount that provides about 1% to about 4%, about 1% to about 3%, or about 1% to about 2.5% of elemental phosphorous based on the weight of the untreated textile substrate.

The textile substrate used in this second embodiment of the invention can be any suitable textile substrate. The textile substrate generally comprises a fabric formed from one or more pluralities or types of yarns. The textile substrate can be formed from a single plurality or type of yarn (e.g., the fabric can be formed solely from yarns comprising a blend of cellulosic fibers and synthetic fibers, such as polyamide fibers), or the textile material can be formed from several pluralities or different types of yarns (e.g., the fabric can be formed from a first plurality of yarns comprising cellulosic fibers and polyamide fibers and a second plurality of yarns comprising an inherent flame resistant fiber).

The yarns used in making the textile materials of the invention can be any suitable type of yarn. Preferably, the yarns are spun yarns. In such embodiments, the spun yarns can be made from a single type of staple fiber (e.g., spun yarns formed solely from cellulose fibers or spun yarns formed solely from inherent flame resistant fibers), or the spun yarns can be made from a blend of two or more different types of staple fibers (e.g., spun yarns formed from a blend of cellulose fibers and thermoplastic synthetic staple fibers, such as polyamide fibers). Such spun yarns can be formed by any suitable spinning process, such as ring spinning, air-jet spinning, or open-end spinning. In certain embodiments, the yarns are spun using a ring spinning process (i.e., the yarns are ring spun yarns).

The textile materials of the invention can be of any suitable construction. In other words, the yarns forming the textile material can be provided in any suitable patternwise arrangement producing a fabric. Preferably, the textile materials are provided in a woven construction, such as a plain weave, basket weave, twill weave, satin weave, or sateen weave. Suitable plain weaves include, but are not limited to, ripstop weaves produced by incorporating, at regular intervals, extra yarns or reinforcement yarns in the warp, fill, or both the warp and fill of the textile material during formation. Suitable twill weaves include both warp-faced and fill-faced twill weaves, such as 2/1, 3/1, 3/2, 4/1, 1/2, 1/3, or 1/4 twill weaves. In certain embodiments of the invention, such as when the textile material is formed from two or more pluralities or different types of yarns, the yarns are disposed in a patternwise arrangement in which one of the yarns is predominantly disposed on one surface of the textile material. In other words, one surface of the textile material is predominantly formed by one yarn type. Suitable patternwise arrangements or constructions that provide such a textile material include, but are not limited to, satin weaves, sateen weaves, and twill weaves in which, on a single surface of the fabric, the fill yarn floats and the warp yarn floats are of different lengths.

Preferably, the textile substrate comprises cellulosic fibers. As utilized herein, the term "cellulosic fibers" refers to fibers composed of, or derived from, cellulose. Examples of suitable cellulosic fibers include cotton, rayon, linen, jute, hemp, cellulose acetate, and combinations, mixtures, or blends thereof. Preferably, the cellulosic fibers comprise cotton fibers.

In those embodiments of the textile material comprising cotton fibers, the cotton fibers can be of any suitable variety. Generally, there are two varieties of cotton fibers that are readily available for commercial use in North America: the Upland variety (*Gossypium hirsutum*) and the Pima variety (*Gossypium barbadense*). The cotton fibers used as the cellulosic fibers in the invention can be cotton fibers of either the Upland variety, the Pima variety, or a combination, mixture, or blend of the two. Generally, cotton fibers of the Upland variety, which comprise the majority of the cotton used in the apparel industry, have lengths ranging from about 0.875 inches to about 1.3 inches, while the less common fibers of the Pima variety have lengths ranging from about 1.2 inches to about 1.6 inches. In a preferred embodiment, at least some of the cotton fibers used in the textile substrate are of the Pima variety, which are preferred due to their greater, more uniform length.

In those embodiments in which the textile substrate comprises cellulosic fibers, the cellulosic fibers can be present in the yarns making up the textile substrate in any suitable amount. For example, in preferred embodiments, the cellulosic fibers can comprise about 20% or more (e.g., about 30% or more), by weight, of the fibers present in one of the pluralities or types of yarn used in making the textile substrate. In a possibly preferred embodiment, the cellulosic fibers can comprise about 100%, by weight, of the fibers used in making the textile substrate. In certain other preferred embodiments, the yarn can include non-cellulosic fibers. In such preferred embodiments, the cellulosic fibers can comprise about 20% to about 100% (e.g., about 30% to about 90%), by weight, of the fibers present in one of the pluralities or types of yarn used in making the textile substrate. The remainder of the yarn can be made up of any suitable non-cellulosic fiber or combination of non-cellulosic fibers, such as the thermoplastic synthetic fibers and inherent flame resistant fibers discussed below.

In those embodiments in which the textile substrate comprises cellulosic fibers, the cellulosic fibers can be present in the textile substrate in any suitable amount. For example, in certain embodiments, the cellulosic fibers can comprise about 15% or more, about 20% or more, about 25% or more, about 30% or more, or about 35% or more, by weight, of the fibers present in the textile substrate. While the inclusion of cellulosic fibers can improve the comfort of the textile substrate (e.g., improve the hand and moisture absorbing characteristics), the exclusive use of cellulosic fibers can deleteriously affect the durability of the textile substrate. Accordingly, it may be desirable to use other fibers (e.g., synthetic fibers) in combination with the cellulosic fibers in order to achieve a desired level of durability. Thus, in such embodiments, the cellulosic fibers can comprise about 95% or less or about 90% or less, by weight, of the fibers present in the textile substrate. More specifically, in certain embodiments, the cellulosic fibers can comprise about 15% to about 95%, about 20% to about 95%, about 25% to about 95%, about 30% to about 95%, or about 30% to about 90%, by weight, of the fibers present in the textile material.

In certain embodiments of the invention, one or more of the yarns in the textile substrate can comprise thermoplastic synthetic fibers. For example, the yarn can comprise a blend of cellulosic fibers and thermoplastic synthetic fibers. These thermoplastic synthetic fibers typically are included in the textile substrate in order to increase its durability to, for example, industrial washing conditions. In particular, thermoplastic synthetic fibers tend to be rather durable to abrasion and harsh washing conditions employed in industrial laundry facilities and their inclusion in, for example, a cellulosic fiber-containing spun yarn can increase that yarns durability to such conditions. This increased durability of the yarn, in turn, leads to an increased durability for the textile substrate. Suitable thermoplastic synthetic fibers include, but are not necessarily limited to, polyester fibers (e.g., poly(ethylene terephthalate) fibers, poly(propylene terephthalate) fibers, poly(trimethylene terephthalate) fibers), poly(butylene terephthalate) fibers, and blends thereof), polyamide fibers (e.g., nylon 6 fibers, nylon 6,6 fibers, nylon 4,6 fibers, and nylon 12 fibers), polyvinyl alcohol fibers, and combinations, mixtures, or blends thereof.

In those embodiments in which the textile substrate comprises thermoplastic synthetic fibers, the thermoplastic synthetic fibers can be present in one of the pluralities or types of yarn used in making the textile substrate in any suitable amount. In certain preferred embodiments, the thermoplastic synthetic fibers comprise about 65% or less, about 60% or less, or about 50% or less, by weight, of the fibers present in one of the pluralities or types of yarn used in making the textile material. In certain preferred embodiments, the thermoplastic synthetic fibers comprise about 5% or more or about 10% or more, by weight, of the fibers present in one of the pluralities or types of yarn used in making the textile material. Thus, in certain preferred embodiments, the thermoplastic synthetic fibers comprise about 0% to about 65% (e.g., about 5% to about 65%), about 5% to about 60%, or about 10% to about 50%, by weight, of the fibers present in one of the pluralities or types of yarn used in making the textile material.

In one preferred embodiment, the textile substrate comprises a plurality of yarns comprising a blend of cellulosic fibers and synthetic fibers (e.g., synthetic staple fibers). In this embodiment, the synthetic fibers can be any of those described above, with polyamide fibers (e.g., polyamide staple fibers) being particularly preferred. In such an embodiment, the cellulosic fibers comprise about 30% to about 90% (e.g., about 40% to about 90%, about 50% to about 90%, about 70% to about 90%, or about 75% to about 90%), by weight, of the fibers present in the yarn, and the polyamide fibers comprise about 10% to about 50% (e.g., about 10% to about 40%, about 10% to about 35%, about 10% to about 30%, or about 10% to about 25%), by weight, of the fibers present in the yarn.

In those embodiments in which the textile substrate comprises thermoplastic synthetic fibers, the thermoplastic synthetic fibers can be present in the textile substrate in any suitable amount. For example, in certain embodiments, the thermoplastic synthetic fibers can comprise about 1% or more, about 2.5% or more, about 5% or more, about 7.5% or more, or about 10% or more, by weight, of the fibers present in the textile material. The thermoplastic synthetic fibers can comprise about 40% or less, about 35% or less, about 30% or less, about 25% or less, about 20% or less, or about 15% or less, by weight, of the fibers present in the textile material. More specifically, in certain embodiments, the thermoplastic synthetic fibers can comprise about 1% to about 40%, about 2.5% to about 35%, about 5% to about 30% (e.g., about 5% to about 25%, about 5% to about 20%, or about 5% to about 15%), or about 7.5% to about 25% (e.g., about 7.5% to about 20%, or about 7.5% to about 15%), by weight, of the fibers present in the textile substrate.

As noted above, certain embodiments of the textile substrate of the invention contain yarns comprising inherent flame resistant fibers. As utilized herein, the term "inherent flame resistant fibers" refers to synthetic fibers which, due to the chemical composition of the material from which they are made, exhibit flame resistance without the need for an additional flame retardant treatment. In such embodiments, the inherent flame resistant fibers can be any suitable inherent flame resistant fibers, such as polyoxadiazole fibers, polysulfonamide fibers, poly(benzimidazole) fibers, poly(phenylenesulfide) fibers, meta-aramid fibers, para-aramid fibers, polypyridobisimidazole fibers, polybenzylthiazole fibers, polybenzyloxazole fibers, melamine-formaldehyde polymer fibers, phenol-formaldehyde polymer fibers, oxidized polyacrylonitrile fibers, polyamide-imide fibers and combinations, mixtures, or blends thereof. In certain embodiments, the inherent flame resistant fibers are preferably selected from the group consisting of polyoxadiazole fibers, polysulfonamide fibers, poly(benzimidazole) fibers, poly(phenylenesulfide) fibers, meta-aramid fibers, para-aramid fibers, and combinations, mixtures, or blends thereof.

The inherent flame resistant fibers can be present in one of the pluralities or types of yarn used in making the textile substrate in any suitable amount. For example, in certain embodiments, the inherent flame resistant fibers can comprise about 100%, by weight, of the fibers present in one of the pluralities or types of yarn used in making the textile substrate. In those embodiments in which the textile material comprises a yarn containing a blend of cellulosic fibers and inherent flame resistant fibers, the inherent flame resistant fibers can comprise about 5% or more, about 10% or more, about 20% or more, about 30% or more, about 40% or more, or about 50% or more, by weight, of the fibers present in the yarn. Thus, in such embodiments, the inherent flame resistant fibers can comprise about 5% to about 95% or about 10% to about 65%, by weight, of the fibers present in the yarn. More preferably, in such an embodiment, the inherent flame resistant fibers can comprise about 20% to about 50%, by weight, of the fibers present in the yarn.

The inherent flame resistant fibers can be present in the textile substrate in any suitable amount. Generally, the amount of inherent flame resistant fibers included in the textile substrate will depend upon the desired properties of the final textile substrate. In certain embodiments, the inherent flame resistant fibers can comprise about 20% or more, about 25% or more, about 30% or more, about 35% or more, about 40% or more, or about 45% or more, by weight, of the fibers present in the textile substrate. In certain embodiments, the inherent flame resistant fibers can comprise about 75% or less, about 70% or less, about 65% or less, about 60% or less, about 55% or less, about 50% or less, about 45% or less, or about 40% or less, by weight, of the fibers present in the textile substrate. Thus, in certain embodiments, the inherent flame resistant fibers can comprise about 20% to about 70%, about 25% to about 75% (e.g., about 25% to about 60%, about 25% to about 50%, about 25% to about 45%, or about 25% to about 40%), about 30% to about 70%, about 35% to about 65%, about 40% to about 60%, or about 45% to about 55%, by weight, of the fibers present in the textile substrate.

The textile material of the invention can be made by any suitable process. In a third embodiment, the invention provides a method for treating a textile substrate, which method can be used to produce the textile material of the invention. The method can comprise the steps of (a) providing a textile substrate, (b) contacting at least a portion of the textile substrate with a treatment composition to deposit the treatment composition thereon, the treatment composition comprising a precondensate compound and a cross-linking composition, (c) heating the textile substrate from step (b) to a temperature sufficient for the precondensate compound and the cross-linking composition to react in a condensation reaction and produce a phosphorous-containing intermediate polymer, and (d) exposing at least a portion of the textile substrate having the phosphorous-containing intermediate polymer thereon to an oxidizing agent under conditions sufficient to convert at least a portion of the phosphorous atoms in the phosphorous-containing intermediate polymer to a pentavalent state.

The textile substrate used in the method embodiment of the invention can be any suitable textile substrate. Suitable textile substrates have been described above in connection with the second embodiment of the invention, and each of the textile substrates described therein can be used in the method embodiment of the invention.

In the second step of the method embodiment, the textile substrate is contacted with a treatment composition. The textile substrate can be contacted with the treatment composition using any suitable technique, such as any of the wet processing techniques commonly used to treat textile materials. For example, the textile substrate can be contacted with the treatment composition by padding, foaming, or jet "dyeing" (i.e., treating the textile substrate in a jet dyeing machine containing the treatment composition instead of or in addition to a dye liquor).

The treatment composition can comprise a precondensate compound and a cross-linking composition. The precondensate compound and the cross-linking composition used in the method embodiment of the invention can be any of the precondensate compounds and the cross-linking compositions described above in connection with the first and second embodiments of the invention.

The precondensate compound and the cross-linking composition can be present in the treatment composition in any suitable amount. The amounts of the two components in the treatment composition can be expressed in terms of the initial weight ratio of the two components. In a preferred embodiment, the precondensate compound and the cross-linking composition are present in the treatment composition in an initial weight ratio of about 1:2 or more, about 1:1 or more, about 3:2 or more, about 2:1 or more, or about 3:1 or more. In another preferred embodiment, the precondensate compound and the cross-linking composition are present in the treatment composition in an initial weight ratio of precondensate compound to cross-linking composition of about 10:1 or less, about 9:1 or less, about 8:1 or less, about 7:1 or less, about 6:1 or less, about 5:1 or less, about 4:1 or less, or about 3:1 or less. Thus, in certain preferred embodiments, the precondensate compound and the cross-linking composition are present in the treatment composition in an initial weight ratio of precondensate compound to cross-linking composition of about 1:2 to about 10:1 (e.g., about 1:2 to about 5:1), about 1:1 to about 10:1 (e.g., about 1:1 to about 8:1, about 1:1 to about 6:1, about 1:1 to about 5:1, or about 1:1 to about 4:1), about 3:2 to about 10:1 (e.g., about 3:2 to about 8:1, about 3:2 to about 4:1), or about 2:1 to about 10:1 (e.g., about 2:1 to about 8:1, about 2:1 to about 6:1, about 2:1 to about 5:1, about 2:1 to about 4:1, or about 2:1 to about 3:1). In one preferred embodiment, such as when the cross-linking composition comprises urea, the precondensate compound and the cross-linking composition are reacted at an initial weight ratio of precondensate compound to cross-linking composition of about 1:1 to about 5:1, more preferably about 2:1 to about 4:1, or about 3:1. As was the case in calculating the weight ratios of the precondensate compound and cross-linking composition used to produce the phosphorous-containing polymer described above, the weight of the cross-linking composition used to calculate the foregoing ratios is only that portion of the composition's weight that is attributable to "reactive" cross-linking agents present in the cross-linking composition.

The treatment composition can be applied to the textile substrate in any suitable amount. One suitable means for expressing the amount of treatment composition that is applied to the textile substrate is specifying the amount of elemental phosphorous that is added as a percentage of the weight of the untreated textile substrate (i.e., the textile substrate prior to the application of the treatment composition described herein). This percentage can be calculated by taking the weight of elemental phosphorous added, dividing this value by the weight of the untreated textile substrate, and multiplying by 100%. Typically, the treatment composition is applied to the textile substrate in an amount that provides about 0.5% or more (e.g., about 1% or more, about 1.5% or more, about 2% or more, about 2.5% or more, about 3% or more, about 3.5% or more, about 4% or more, or about 4.5% or more) of elemental phosphorus based on the weight of the untreated textile substrate. The treatment composition is also typically applied to the textile substrate in an amount that provides about 5% or less (e.g., about 4.5% or less, about 4% or less, about 3.5% or less, about 3% or less, about 2.5% or less, about 2% or less, about 1.5% or less, or about 1% or less) of elemental phosphorus based on the weight of the untreated textile substrate. Preferably, the treatment composition is applied to the textile substrate in an amount that provides about 1% to about 4% (e.g., about 1% to about 3% or about 1% to about 2%) of elemental phosphorous based on the weight of the untreated textile substrate.

In order to accelerate the condensation reaction between the precondensate compound and the cross-linking composition, the treated textile substrate typically is heated to a temperature sufficient for the precondensate compound and the cross-linking composition to react and produce a phosphorous-containing intermediate polymer on the textile substrate. The time and elevated temperature used in this step can be any suitable combination of time and temperature that results in the reaction of the precondensate compound and cross-linking composition to the desired degree. When the textile substrate comprises cellulosic fibers, the time and elevated temperatures used in this step can also promote the formation of covalent bonds between the cellulosic fibers and the phosphorous-containing intermediate polymer produced by the condensation reaction, which is believed to contribute to the durability of the flame retardant treatment. However, care must be taken not to use excessively high temperatures or excessively long cure times that might result in excessive reaction of the phosphorous-containing intermediate polymer with the cellulosic fibers, which might weaken the cellulosic fibers and the textile substrate. Furthermore, it is believed that the elevated temperatures used in the curing step can allow the precondensate compound and cross-linking composition to diffuse into the cellulosic fibers where they then react to form the phosphorus-containing intermediate polymer within the cellulosic fibers. Suitable temperatures and times for this step will vary depending upon the oven used and the speed with which heat is transferred to the textile substrate, but suitable conditions can range from temperatures of about 149° C. (300° F.) to about 177° C. (350° F.) and times from about 1 minute to about 3 minutes.

After the treatment composition has been applied to the textile substrate and the components of the treatment composition have been allowed to react in the above-described condensation reaction, the resulting textile substrate can be exposed to an oxidizing agent in order to convert at least a portion of the phosphorous atoms in the phosphorous-containing intermediate polymer into a pentavalent state. The mechanism of and reasons for this conversion have been described above in connection with the first embodiment of the invention. Furthermore, oxidizing agents suitable for use in this step have also been described above in connection with the first embodiment of the invention, and each of these oxidizing agents (or any suitable combination thereof) can be used in this method embodiment of the invention.

The textile substrate can be exposed to the oxidizing agent using any suitable technique. For example, the textile substrate can be exposed to the oxidizing agent using any of the wet processing techniques commonly used to treat textile materials, such as those described above in connection with the second step of the method embodiment of the invention. The amount of oxidizing agent used in treating the textile substrate can vary depending on the actual materials used, but typically the oxidizing agent is incorporated in a solution containing about 0.1% or more (e.g., about 0.5% or more, about 0.8% or more, about 1% or more, about 2% or more, or about 3% or more) and about 20% or less (e.g., about 15% or less, about 12% or less, about 10% or less, about 3% or less, about 2% or less, or about 1% or less), by weight, of the oxidizing agent.

After contacting the textile substrate with the oxidizing agent, the treated textile material can be contacted with a neutralizing solution (e.g., a caustic solution with a pH of about 8 or more, about 9 or more, about 10 or more, about 11 or more, or about 12 or more). The actual components of the caustic solution can widely vary, but suitable components include any strong base, such as alkalis. For example, sodium hydroxide (soda), potassium hydroxide (potash), calcium oxide (lime), or any combination thereof can be used in the neutralizing solution. The amount of base depends on the size of the bath and is determined by the ultimately desired pH level. A suitable amount of caustic in the solution is about 0.1% or more (e.g., about 0.5% or more, about 0.8% or more, about 1% or more, about 2% or more, or about 3% or more) and is about 10% or less (e.g., about 8% or less, about 6% or less, about 5% or less, about 3% or less, about 2% or less, or about 1% or less). The contact time of the treated textile material with the caustic solution varies, but typically is about 30 seconds or more (e.g., about 1 min or more, about 3 min or more, about 5 min or more, or about 10 min or more). If desired, the neutralizing solution can be warmed (e.g., up to about 75° C. greater, up to about 70° C. greater, up to about 60° C. greater, up to about 50° C. greater, up to about 40° C. greater, or up to about 30° C. greater than the ambient temperature).

After the treated textile material has been contacted with the oxidizing agent as described above and, if desired, contacted with a neutralizing solution as described above, the treated textile material typically is rinsed to remove any unreacted components from the treatment composition, any residual oxidizing agent, and (if the neutralization step was performed) any residual components from the neutralizing solution. The treated textile material can be rinsed in any suitable medium, provided the medium does not degrade the phosphorous-containing polymer. Typically, the treated textile material is rinsed in water (e.g., running water) until the pH of the water is relatively neutral, such as a pH of about 6 to about 8, or about 7. After rinsing, the treated textile material is dried using suitable textile drying conditions.

If desired, the textile substrate can be treated with one or more softening agents (also known as "softeners") to improve the hand of the treated textile material. The softening agent selected for this purpose should not have a deleterious effect on the flammability of the resultant fabric. Suitable softeners include polyolefins, alkoxylated alcohols (e.g., ethoxylated alcohols), alkoxylated ester oils (e.g., ethoxylated ester oils), alkoxylated fatty amines (e.g., ethoxylated tallow amine), alkyl glycerides, alkylamines, quaternary alkylamines, halogenated waxes, halogenated esters, silicone compounds, and mixtures thereof. In a preferred embodiment, the softener is selected from the group consisting of cationic softeners and nonionic softeners.

The softener can be present in the textile material in any suitable amount. One suitable means for expressing the amount of treatment composition that is applied to the textile substrate is specifying the amount of softener that is applied to the textile substrate as a percentage of the weight of the untreated textile substrate (i.e., the textile substrate prior to the application of the treatment composition described herein). This percentage can be calculated by taking the weight of softener solids applied, dividing this value by the weight of the untreated textile substrate, and multiplying by 100%. Preferably, the softener is present in the textile material in an amount of about 0.1% or more, about 0.2% or more, or about 0.3% or more, by weight, based on the weight of the untreated textile substrate. Preferably, the softener is present in the textile material in an amount of about 10% or less, about 9% or less, about 8% or less, about 7% or less, about 6% or less, or about 5% or less, by weight, based on the weight of the untreated textile substrate. Thus, in certain preferred embodiments, the softener is present in the textile material in an amount of about 0.1% to about 10%, about 0.2% to about 9% (e.g., about 0.2% to about 8%, about 0.2% to about 7%, about 0.2% to about 6%, or about 0.2% to about 5%), or about 0.3% to about 8% (e.g., about 0.3% to about 7%, about 0.3% to about 6%, or about 0.3% to about 5%), by weight, based on the weight of the untreated textile substrate.

The softener can be applied to the textile substrate at any suitable time. For example, the softener can be added to the treatment composition described above (i.e., the treatment composition comprising the precondensate compound and the cross-linking composition) so that the softener is applied to the textile substrate at the same time as the phosphorous-containing polymer. The softener can also be applied to the textile substrate following treatment of the textile substrate with the treatment composition described above. In this instance, the softener typically would be applied after the textile substrate has been treated, dried, cured, oxidized, and, if desired, rinsed as described above. In a preferred embodiment of the method described herein, the softener is applied to the textile substrate in two separate applications. The first application is incorporated into the treatment composition (i.e., the treatment composition comprising the precondensate compound and the cross-linking composition), and the second application is applied to the dry, treated textile material following the steps of treatment, drying, curing, oxidation, rinsing, and drying as described above. In this embodiment, the softener is divided among the two applications so that the final amount of softener applied to the treated textile material falls within one of the ranges described above.

To further enhance the textile material's hand, the textile substrate can optionally be treated using one or more mechanical surface treatments. A mechanical surface treatment typically relaxes stress imparted to the fabric during curing and fabric handling, breaks up yarn bundles stiffened during curing, and increases the tear strength of the treated fabric. Examples of suitable mechanical surface treatments include treatment with high-pressure streams of air or water (such as those described in U.S. Pat. No. 4,918,795, U.S. Pat. No. 5,033,143, and U.S. Pat. No. 6,546,605), treatment with steam jets, needling, particle bombardment, ice-blasting, tumbling, stone-washing, constricting through a jet orifice, and treatment with mechanical vibration, sharp bending, shear, or compression. A sanforizing process may be used instead of, or in addition to, one or more of the above processes to improve the fabric's hand and to control the fabric's shrinkage. Additional mechanical treatments that may be used to impart softness to the treated fabric, and which may also be followed by a sanforizing process, include napping, napping with diamond-coated napping wire, gritless sanding, patterned sanding against an embossed surface, shot-peening, sand-blasting, brushing, impregnated brush rolls, ultrasonic agitation, sueding, engraved or patterned roll abrasion, and impacting against or with another material, such as the same or a different fabric, abrasive substrates, steel wool, diamond grit rolls, tungsten carbide rolls, etched or scarred rolls, or sandpaper rolls.

The following examples further illustrate the subject matter described above but, of course, should not be construed as in any way limiting the scope thereof.

EXAMPLE 1

This example demonstrates the production of precondensate compounds in accordance with the invention. Six different precondensate compounds (Samples 1A-1F) were produced by separately reacting six suspensions containing given amounts of melamine powder with an aqueous solution of tetrahydroxymethyl phosphonium sulfate (THPS). The aqueous solution used to produce each precondensate compound contained approximately 75% by weight tetrahydroxymethyl phosphonium sulfate. Table 1 sets forth the amounts of melamine powder, dispersing water, and THPS solution used to produce each precondensate compound. Table 1 also sets forth the molar ratio of THPS to melamine used to produce each precondensate, with the ratio being expressed as the initial molar ratio of phosphonium cations to nitrogen-containing compound, as discussed above.

TABLE 1

Amounts of melamine powder, dispersing water, and THPS solution used to make Samples 1A-1F.

| Sample | Melamine Suspension | | Amount of THPS solution | Initial Molar Ratio of THPS: Melamine |
|---|---|---|---|---|
| | Amount of Melamine | Amount of Water | | |
| 1A | 3 g | approx. 35 g | 100 g | 15.5:1 |
| 1B | 4 g | approx. 35 g | 100 g | 11.6:1 |
| 1C | 5 g | approx. 35 g | 100 g | 9.3:1 |
| 1D | 6 g | approx. 35 g | 100 g | 7.8:1 |
| 1E | 7 g | approx. 35 g | 100 g | 6.7:1 |
| 1F | 8 g | 32 g | 100 g | 5.8:1 |

To produce each precondensate compound, the indicated amount of melamine powder was added to the indicated amount of water. The resulting mixture of melamine powder and water was then added to the indicated amount of the THPS solution. The resulting reactant mixture was then stirred for several minutes before being slowly heated to a temperature of approximately 70-80° C. The reactant mixture was held at this elevated temperature until the melamine powder completely dissolved and the reactant mixture became transparent, which was a time of approximately 2-4 hours. The dissolving of the melamine powder indicated that the melamine and the THPS had reacted to produce a water-soluble precondensate compound, as described above. The resulting transparent solution was then allowed to cool to ambient temperature. Some of the resulting precondensate compounds were then used to treat textile substrates, as described in subsequent examples.

EXAMPLE 2

This example demonstrates the production of a treated textile material in accordance with the invention. Approximately 60 grams of the precondensate compound Sample 1F (from Example 1) was combined with approximately 14 grams of ethylene urea (as the cross-linking composition), approximately 16 grams of water, and approximately 8 grams of a cationic softener emulsion (approximately 35% by weight softener solids) to form a treatment composition. A piece of woven fabric made from yarns containing approximately 88% by weight cotton and approximately 12% by weight nylon 6,6 was then impregnated with the treatment composition. The wet pickup of the fabric was approximately 60% owf. The impregnated fabric was dried in a convection oven at a temperature of approximately 250° F. (approximately 120° C.) for approximately 3 minutes and then cured in a convection oven at a temperature of approximately 340° F. (approximately 170° C.) for approximately 3 minutes. After curing, the resulting fabric was then immersed in a 4% hydrogen peroxide solution for approximately 1.5 minutes. The fabric was next immersed in a 4% sodium hydroxide solution for approximately 3 minutes and finally rinsed in running water until the rinse water exhibited a pH of approximately 7. After rinsing, the fabric was then dried in a convection oven at a temperature of approximately 330° F. (approximately 165° C.) for approximately 3 minutes.

The resulting treated textile material comprises a textile substrate (i.e., the woven fabric) and a phosphorous-containing polymer. The phosphorous-containing polymer is the product of the condensation reaction between the precondensate compound (i.e., Sample 1F from Example 1) and the cross-linking composition (i.e., ethylene urea) which has been subsequently oxidized (by the treatment with hydrogen peroxide) to convert at least a portion of the phosphorous in the polymer to a pentavalent state.

EXAMPLE 3

This example demonstrates the production of treated textile materials in accordance with the invention and the flame resistant properties of the treated textile materials and garments made from the same. Two woven fabrics having weights of approximately 6 ounces per square yard (approximately 200 g/m$^2$) and 8 oz/yd$^2$ (approximately 270 g/m$^2$) made from yarns containing approximately 88% cotton and approximately 12% nylon were treated in accordance with the procedure described in Example 2. Following treatment, the woven fabrics weighed approximately 7 oz/yd$^2$ (approximately 240 g/m$^2$) and approximately 9 oz/yd$^2$ (approximately 300 g/m$^2$), respectively.

After treatment, a sample of each woven fabric was tested in accordance with the National Fire Protection Association (NFPA) 701 standard test method to determine its flame resistant properties. When tested in accordance with this standard, the samples exhibited char lengths of less than 4 inches (10 cm) and no afterflame.

A portion of each woven fabric was cut and sewn into coverall garments. The coverall garments were then tested in accordance with the procedures of ASTM F1930-11 in order to assess each garment's flame resistant properties. When tested in accordance with this standard, the coverall garment made from the 9 oz/yd$^2$ (300 g/m$^2$) fabric exhibited a total body burn of approximately 7.1% after a 3 second flash fire exposure when the uncovered head and hands of the manikin were included, and a total body burn of approximately 0.5% when the uncovered head and hands were excluded. The coverall garment made from the 7 oz/yd$^2$ (240 g/m$^2$) fabric exhibited a total body burn of approximately 13.4% after a 3 second flash fire exposure when the uncovered head and hands of the manikin were included. By way of comparison, similar fabrics treated with a commercial ammonia process typically exhibit total body burns of about 12% for a 9 oz/yd$^2$ (300 g/m$^2$) fabric and 30% for a 7 oz/yd$^2$ (240 g/m$^2$) fabric when the uncovered head and hands of the manikin are included.

EXAMPLE 4

This example demonstrates the production of a treated textile material in accordance with the invention. A woven fabric such as that described in Example 2 was treated in accordance with the general procedure described in Example 2, except that the treatment composition contained approximately 60 grams of the precondensate compound Sample 1A (from Example 1), approximately 18 grams of ethylene urea as the cross-linking composition, approximately 2 grams of a 12% sodium hydroxide solution, and approximately 12 grams of water. It is expected that the resulting textile material will exhibit flame resistant properties that are similar to those exhibited by the textile material produced in Example 2.

EXAMPLE 5

This example demonstrates the production of a treated textile material in accordance with the invention. A woven fabric such as that described in Example 2 was treated in accordance with the general procedure described in Example 2, except that the treatment composition contained 60 grams of the precondensate compound Sample 1A (from Example 1), a cross-linking composition containing approximately 12 grams of ethylene urea and approximately 3 grams of urea, approximately 2 grams of a 12% sodium hydroxide solution, and approximately 14 grams of water. It is expected that the resulting textile material will exhibit flame resistant properties that are similar to those exhibited by the textile material produced in Example 2.

EXAMPLE 6

Woven fabrics made from warp yarns containing approximately 50% cotton and approximately 50% nylon and filling yarns containing a NOMEX® IIIA fiber blend are treated in accordance with the procedure described in Example 2. The woven fabrics can contain from approximately 30% to approximately 50% NOMEX® fiber, depending on the number of filling yarns used to form the woven fabrics and the size of those filing yarns relative to the warp yarns. The remaining portion of the fabric's fiber content is roughly equally divided between cotton fibers and nylon fibers. Prior to treatment, the fabrics will have weights ranging from approximately 5.5 oz/yd² (approximately 190 g/m²) to approximately 7.5 oz/yd² (approximately 250 g/m²).

After treatment, it is expected that the woven fabrics will exhibit desirable flame resistant properties making them suitable for use in a variety of applications.

EXAMPLE 7

This example demonstrates the production of a treated textile material in accordance with the invention. A precondensate was made in accordance with general procedure described in Example 1 using a reactant mixture containing approximately 87% by weight of the tetrahydroxymethyl phosphonium sulfate solution, approximately 2.7% by weight melamine, and water. Approximately 50 grams of the resulting precondensate was combined with approximately 8 grams of ethylene urea (20 grams of a 40% by weight solids solution) and approximately 5 grams of urea (as the cross-linking composition), approximately 16 grams of water, and approximately 8 grams of a cationic softener emulsion (approximately 35% by weight softener solids) to form a treatment composition.

A piece of woven fabric made from yarns containing approximately 88% by weight cotton and approximately 12% by weight nylon 6,6 and weighing approximately 7 oz/yd² (240 g/m²) was then treated with the treatment composition in accordance with the general procedure described in Example 2. The wet pickup of the fabric was approximately 75% owf.

The resulting treated textile material exhibited improved vertical burn and reduced afterflame as compared to the untreated fabric.

EXAMPLE 8

This example demonstrates the production of a treated textile material in accordance with the invention. Approximately 53.3 grams of a precondensate made in accordance with the procedure described in Example 7 was combined with approximately 18.4 grams of urea (as the cross-linking composition), approximately 16 grams of water, and approximately 8 grams of a cationic softener emulsion (approximately 35% by weight softener solids) to form a treatment composition.

A piece of woven fabric made from yarns containing approximately 88% by weight cotton and approximately 12% by weight nylon 6,6 and weighing approximately 7 oz/yd² (240 g/m²) was then treated with the treatment composition in accordance with the general procedure described in Example 2. The wet pickup of the fabric was approximately 75% owf.

The resulting treated textile material exhibited improved vertical burn and reduced afterflame as compared to the untreated fabric.

A portion of the woven fabric was cut and sewn into a coverall garment. The coverall garment was then tested in accordance with the procedures of ASTM F1930-11 in order to assess the garment's flame resistant properties. When tested in accordance with this standard, the coverall garment exhibited a total body burn of approximately 9.02% after a 3 second flash fire exposure when the uncovered head and hands of the manikin were included. A coverall garment made with a similar fabric weighing (prior to treatment) approximately 6 oz/yd² (200 g/m²) exhibited a total body burn of approximately 11.48% after a 3 second flash fire exposure when the uncovered head and hands of the manikin were included.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the subject matter of this application (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the subject matter of the application and does not pose a limitation on the scope of the subject matter unless otherwise claimed. No language in the specification should be construed as indicating any non-claimed element as essential to the practice of the subject matter described herein.

Preferred embodiments of the subject matter of this application are described herein, including the best mode known to the inventors for carrying out the claimed subject matter. Variations of those preferred embodiments may become apparent to those of ordinary skill in the art upon reading the foregoing description. The inventors expect skilled artisans to employ such variations as appropriate, and the inventors intend for the subject matter described herein to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

What is claimed is:

1. A flame retardant composition comprising a phosphorous-containing polymer, the phosphorous-containing polymer being produced by:
   (a) reacting a reactant mixture in a condensation reaction to produce a precondensate compound, the reactant mixture comprising a phosphonium compound and a nitrogen-containing compound, wherein:
      (i) the phosphonium compound conforms to the structure of Formula (I)

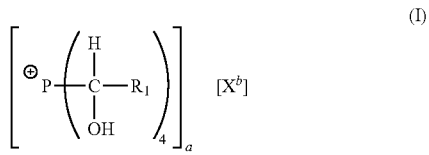

wherein $R_1$ is selected from the group consisting of hydrogen, $C_1$-$C_3$ alkyl, $C_1$-$C_3$ haloalkyl, $C_2$-$C_3$ alkenyl, and $C_2$-$C_3$ haloalkenyl; X is an anion selected from the group consisting of chloride, sulfate, hydrogen sulfate, phosphate, acetate, carbonate, bicarbonate, borate, and hydroxide; b is the charge of the anion X; and a is equal to (−b); and
      (ii) the nitrogen-containing compound conforms to the structure of Formula (II)

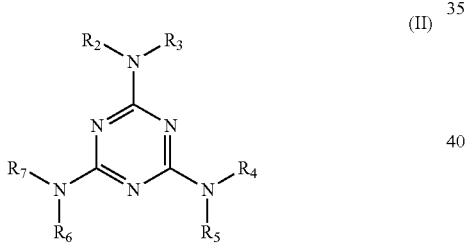

wherein $R_2$, $R_3$, $R_4$, $R_5$, $R_6$, and $R_7$ are independently selected from the group consisting of hydrogen, hydroxymethyl, and alkoxymethyl;
   (b) reacting the precondensate compound from (a) and a cross-linking composition in a condensation reaction to produce a phosphorous-containing intermediate polymer, the cross-linking composition comprising an alkylene urea compound selected from the group consisting of ethylene urea, propylene urea, and mixtures thereof; and
   (c) reacting the phosphorous-containing intermediate polymer from (b) with an oxidizing agent to produce the phosphorous-containing polymer, wherein the phosphorous-containing intermediate polymer is reacted with the oxidizing agent under conditions sufficient to convert at least a portion of the phosphorous atoms in the phosphorous-containing intermediate polymer to a pentavalent state.

2. The flame retardant compound of claim 1, wherein $R_1$ is hydrogen.

3. The flame retardant compound of claim 1, wherein X is sulfate, b is negative two, and a is two.

4. The flame retardant compound of claim 1, wherein $R_2$, $R_3$, $R_4$, $R_5$, $R_6$, and $R_7$ are each hydrogen.

5. The flame retardant compound of claim 1, wherein the cross-linking composition comprises ethylene urea.

6. The flame retardant compound of claim 1, wherein the cross-linking composition comprises an alkylene urea compound and urea.

7. The flame retardant compound of claim 6, wherein the alkylene urea compound and urea are present in the cross-linking composition at an initial molar ratio of alkylene urea compound to urea of about 3:1 to about 1:3.

8. The flame retardant compound of claim 1, wherein the phosphonium compound and the nitrogen-containing compound are reacted at an initial molar ratio of phosphonium cations to nitrogen-containing compound of about 50:1 to about 3:1.

9. The flame retardant compound of claim 1, wherein the precondensate compound and the cross-linking composition are reacted at an initial weight ratio of precondensate compound to cross-linking composition of about 1:2 to about 10:1.

10. A textile material comprising a textile substrate and a phosphorous-containing polymer, the phosphorous-containing polymer being produced by:
   (a) reacting a reactant mixture in a condensation reaction to produce a precondensate compound, the reactant mixture comprising a phosphonium compound and a nitrogen-containing compound, wherein:
      (i) the phosphonium compound conforms to the structure of Formula (I)

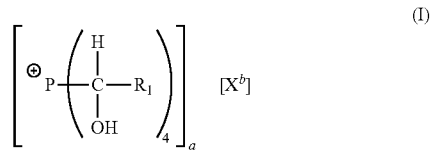

wherein $R_1$ is selected from the group consisting of hydrogen, $C_1$-$C_3$ alkyl, $C_1$-$C_3$ haloalkyl, $C_2$-$C_3$ alkenyl, and $C_2$-$C_3$ haloalkenyl; X is an anion selected from the group consisting of chloride, sulfate, hydrogen sulfate, phosphate, acetate, carbonate, bicarbonate, borate, and hydroxide; b is the charge of the anion X; and a is equal to (−b); and
      (ii) the nitrogen-containing compound conforms to the structure of Formula (II)

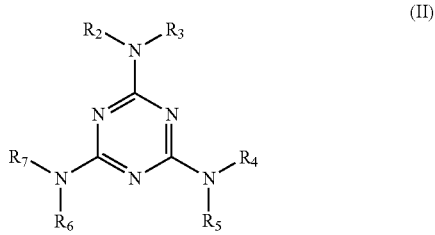

wherein $R_2$, $R_3$, $R_4$, $R_5$, $R_6$, and $R_7$ are independently selected from the group consisting of hydrogen, hydroxymethyl, and alkoxymethyl;
   (b) reacting the precondensate compound from (a) and a cross-linking composition in a condensation reaction to produce a phosphorous-containing intermediate polymer, wherein the cross-linking composition comprises an alkylene urea compound selected from the group consisting of ethylene urea, propylene urea, and mixtures thereof; and (c) reacting the phosphorous-containing intermediate polymer from (b) with an oxidizing agent to produce the phosphorous-containing polymer, wherein the phosphorous-containing intermediate polymer is reacted with the oxidizing agent under conditions sufficient to convert at least a portion of the phosphorous atoms in the phosphorous-containing intermediate polymer to a pentavalent state.

11. The textile material of claim 10, wherein $R_1$ is hydrogen.

12. The textile material of claim 10, wherein X is sulfate, b is negative two, and a is two.

13. The textile material of claim 10, wherein $R_2$, $R_3$, $R_4$, $R_5$, $R_6$, and $R_7$ are each hydrogen.

14. The textile material of claim 10, wherein the cross-linking composition comprises ethylene urea.

15. The textile material of claim 10, wherein the cross-linking composition comprises an alkylene urea compound and urea.

16. The textile material of claim 15, wherein the alkylene urea compound and urea are present in the cross-linking composition at an initial molar ratio of alkylene urea compound to urea of about 3:1 to about 1:3.

17. The textile material of claim 10, wherein the phosphonium compound and the nitrogen-containing compound are reacted at an initial molar ratio of phosphonium cations to nitrogen-containing compound of about 50:1 to about 3:1.

18. The textile material of claim 10, wherein the precondensate compound and the cross-linking composition are reacted at an initial weight ratio of precondensate compound to cross-linking composition of about 1:2 to about 10:1.

19. The textile material of claim 10, wherein the textile substrate comprises cellulosic fibers.

20. A method for treating a textile substrate, the method comprising the steps of:
(a) providing a textile substrate;
(b) contacting at least a portion of the textile substrate with a treatment composition to deposit the treatment composition thereon, the treatment composition comprising a precondensate compound and a cross-linking composition, the cross-linking composition comprising an alkylene urea compound selected from the group consisting of ethylene urea, propylene urea, and mixtures thereof, the precondensate compound being produced by reacting a reactant mixture in a condensation reaction, the reactant mixture comprising a phosphonium compound and a nitrogen-containing compound, wherein:
(i) the phosphonium compound conforms to the structure of Formula (I)

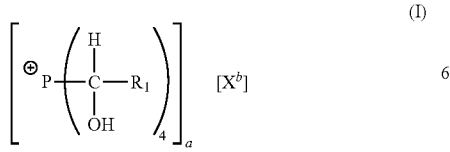

wherein $R_1$ is selected from the group consisting of hydrogen, $C_1$-$C_3$ alkyl, $C_1$-$C_3$ haloalkyl, $C_2$-$C_3$ alkenyl, and $C_2$-$C_3$ haloalkenyl; X is an anion selected from the group consisting of chloride, sulfate, hydrogen sulfate, phosphate, acetate, carbonate, bicarbonate, borate, and hydroxide; b is the charge of the anion X; and a is equal to (−b); and
(ii) the nitrogen-containing compound conforms to the structure of Formula (II)

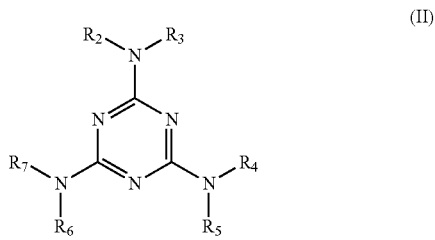

wherein $R_2$, $R_3$, $R_4$, $R_5$, $R_6$, and $R_7$ are independently selected from the group consisting of hydrogen, hydroxymethyl, and alkoxymethyl;
(c) heating the textile substrate from step (b) to a temperature sufficient for the precondensate compound and the cross-linking composition to react in a condensation reaction and produce a phosphorous-containing intermediate polymer; and
(d) exposing at least a portion of the textile substrate having the phosphorous-containing intermediate polymer thereon to an oxidizing agent under conditions sufficient to convert at least a portion of the phosphorous atoms in the phosphorous-containing intermediate polymer to a pentavalent state.

21. The method of claim 20, wherein textile substrate comprises cellulosic fibers.

22. The method of claim 20, wherein $R_1$ is hydrogen.

23. The method of claim 20, wherein X is sulfate, b is negative two, and a is two.

24. The method of claim 20, wherein $R_2$, $R_3$, $R_4$, $R_5$, $R_6$, and $R_7$ are each hydrogen.

25. The method of claim 20, wherein the cross-linking composition comprises ethylene urea.

26. The method of claim 20, wherein the cross-linking composition comprises an alkylene urea compound and urea.

27. The method of claim 26, wherein the alkylene urea compound and urea are present in the cross-linking composition at an initial molar ratio of alkylene urea compound to urea of about 3:1 to about 1:3.

28. The method of claim 20, wherein the phosphonium compound and the nitrogen-containing compound are reacted at an initial molar ratio of phosphonium cations to nitrogen-containing compound of about 50:1 to about 3:1.

29. The method of claim 20, wherein the precondensate compound and the cross-linking composition are present in the treatment composition at an initial weight ratio of precondensate compound to cross-linking composition of about 1:2 to about 10:1.

30. A flame retardant composition comprising a phosphorous-containing polymer, the phosphorous-containing polymer being produced by:
(a) reacting a reactant mixture in a condensation reaction to produce a precondensate compound, the reactant mixture comprising a phosphonium compound and a nitrogen-containing compound, wherein:
(i) the phosphonium compound conforms to the structure of Formula (I)

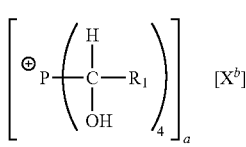

(I)

wherein $R_1$ is selected from the group consisting of hydrogen, $C_1$-$C_3$ alkyl, $C_1$-$C_3$ haloalkyl, $C_2$-$C_3$ alkenyl, and $C_2$-$C_3$ haloalkenyl; X is an anion selected from the group consisting of chloride, sulfate, hydrogen sulfate, phosphate, acetate, carbonate, bicarbonate, borate, and hydroxide; b is the charge of the anion X; and a is equal to (−b); and (ii) the nitrogen-containing compound conforms to the structure of Formula (II)

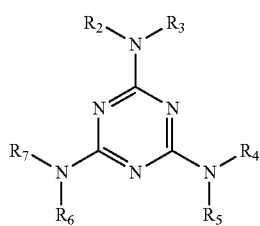

(II)

wherein $R_2$, $R_3$, $R_4$, $R_5$, $R_6$, and $R_7$ are independently selected from the group consisting of hydrogen, hydroxymethyl, and alkoxymethyl;

(b) reacting the precondensate compound from (a) and a cross-linking composition in a condensation reaction to produce a phosphorous-containing intermediate polymer, the cross-linking composition comprising urea; and (c) reacting the phosphorous-containing intermediate polymer from (b) with an oxidizing agent to produce the phosphorous-containing polymer, wherein the phosphorous-containing intermediate polymer is reacted with the oxidizing agent under conditions sufficient to convert at least a portion of the phosphorous atoms in the phosphorous-containing intermediate polymer to a pentavalent state.

31. A textile material comprising a textile substrate and a phosphorous-containing polymer, the phosphorous-containing polymer being produced by:

(a) reacting a reactant mixture in a condensation reaction to produce a precondensate compound, the reactant mixture comprising a phosphonium compound and a nitrogen-containing compound, wherein:

(i) the phosphonium compound conforms to the structure of Formula (I)

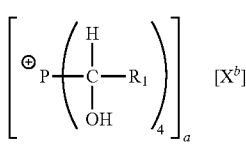

(I)

wherein $R_1$ is selected from the group consisting of hydrogen, $C_1$-$C_3$ alkyl, $C_1$-$C_3$ haloalkyl, $C_2$-$C_3$ alkenyl, and $C_2$-$C_3$ haloalkenyl; X is an anion selected from the group consisting of chloride, sulfate, hydrogen sulfate, phosphate, acetate, carbonate, bicarbonate, borate, and hydroxide; b is the charge of the anion X; and a is equal to (−b); and (ii) the nitrogen-containing compound conforms to the structure of Formula (II)

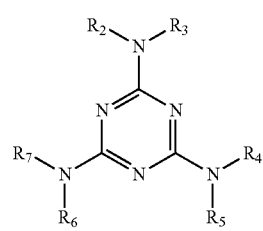

(II)

wherein $R_2$, $R_3$, $R_4$, $R_5$, $R_6$, and $R_7$ are independently selected from the group consisting of hydrogen, hydroxymethyl, and alkoxymethyl;

(b) reacting the precondensate compound from (a) and a cross-linking composition in a condensation reaction to produce a phosphorous-containing intermediate polymer, the cross-linking composition comprising urea; and (c) reacting the phosphorous-containing intermediate polymer from (b) with an oxidizing agent to produce the phosphorous-containing polymer, wherein the phosphorous-containing intermediate polymer is reacted with the oxidizing agent under conditions sufficient to convert at least a portion of the phosphorous atoms in the phosphorous-containing intermediate polymer to a pentavalent state.

32. A method for treating a textile substrate, the method comprising the steps of:

(a) providing a textile substrate;

(b) contacting at least a portion of the textile substrate with a treatment composition to deposit the treatment composition thereon, the treatment composition comprising a precondensate compound and a cross-linking composition, the cross-linking composition comprising urea, the precondensate compound being produced by reacting a reactant mixture in a condensation reaction, the reactant mixture comprising a phosphonium compound and a nitrogen-containing compound, wherein:

(i) the phosphonium compound conforms to the structure of Formula (I)

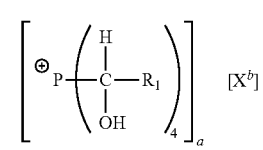

(I)

wherein $R_1$ is selected from the group consisting of hydrogen, $C_1$-$C_3$ alkyl, $C_1$-$C_3$ haloalkyl, $C_2$-$C_3$ alkenyl, and $C_2$-$C_3$ haloalkenyl; X is an anion selected from the group consisting of chloride, sulfate, hydrogen sulfate, phosphate, acetate, carbonate, bicarbonate, borate, and hydroxide; b is the charge of the anion X; and a is equal to (−b); and (ii) the nitrogen-containing compound conforms to the structure of Formula (II)

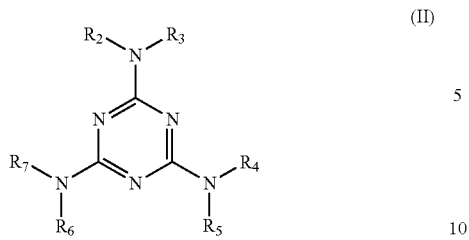

(II)

wherein $R_2$, $R_3$, $R_4$, $R_5$, $R_6$, and $R_7$ are independently selected from the group consisting of hydrogen, hydroxymethyl, and alkoxymethyl;

(c) heating the textile substrate from step (b) to a temperature sufficient for the precondensate compound and the cross-linking composition to react in a condensation reaction and produce a phosphorous-containing intermediate polymer; and (d) exposing at least a portion of the textile substrate having the phosphorous-containing intermediate polymer thereon to an oxidizing agent under conditions sufficient to convert at least a portion of the phosphorous atoms in the phosphorous-containing intermediate polymer to a pentavalent state.

\* \* \* \* \*